(12) United States Patent
Wang et al.

(10) Patent No.: US 8,135,419 B2
(45) Date of Patent: Mar. 13, 2012

(54) METHOD AND APPARATUS OF MEASUREMENT MECHANISM AND EFFICIENT PAGING AND BROADCASTING SCHEME IMPLEMENTATION IN MBMS DEDICATED CELL OF LTE SYSTEMS

(75) Inventors: Jin Wang, Central Islip, NY (US); Peter S. Wang, E. Setauket, NY (US); Ulises Olvera-Hernandez, Kirkland (CA)

(73) Assignee: InterDigital Technology Corporation, Wilmington, DE (US)

( * ) Notice: Subject to any disclaimer, the term of this patent is extended or adjusted under 35 U.S.C. 154(b) by 992 days.

(21) Appl. No.: 12/109,741

(22) Filed: Apr. 25, 2008

(65) Prior Publication Data

US 2008/0268878 A1     Oct. 30, 2008

Related U.S. Application Data

(60) Provisional application No. 60/914,075, filed on Apr. 26, 2007, provisional application No. 60/914,217, filed on Apr. 26, 2007.

(51) Int. Cl.
*H04Q 7/20* (2006.01)
(52) U.S. Cl. .................................. 455/458; 370/310
(58) Field of Classification Search .............. 455/458
See application file for complete search history.

(56) References Cited

U.S. PATENT DOCUMENTS

| | | | |
|---|---|---|---|
| 6,320,861 B1 | 11/2001 | Adam et al. | |
| 6,862,446 B2 | 3/2005 | O'Neill et al. | |
| 2004/0227618 A1 | 11/2004 | Hwang et al. | |
| 2005/0090278 A1* | 4/2005 | Jeong et al. | 455/525 |
| 2005/0271007 A1 | 12/2005 | Hwang et al. | |
| 2006/0182058 A1* | 8/2006 | Jeong et al. | 370/329 |
| 2008/0020745 A1* | 1/2008 | Bae et al. | 455/422.1 |

(Continued)

FOREIGN PATENT DOCUMENTS

EP     1 213 939     6/2002

(Continued)

OTHER PUBLICATIONS

Agilent Technologies, "Block Error Measurement Description", http://wireless.agilent.com/rfcomms/refdocs/gsm/meas_bler_desc.html, (Last Updated on May 8, 2002).

(Continued)

*Primary Examiner* — Charles Appiah
*Assistant Examiner* — Joseph Dean, Jr.
(74) *Attorney, Agent, or Firm* — Robert J. Irvine, III; Eric Berkowitz

(57) ABSTRACT

A WTRU configured to receive a multicast, a unicast or mixed signal. A multimedia signal may be a Multimedia Broadcast Multicast Signal (MBMS). The WTRU switches between an MBMS and a mixed signal and determines optimal time to switch between the MBMS and mixed signal. The WTRU switches between receiving the MBMS and mixed signal in an adaptive or semi-static pattern. A flat broadcast channel (BCH) structure in an MBMS dedicated cell is provided, eliminating need for a dedicated broadcast channel (D-BCH). An MBMS-dedicated cell uses a single paging channel for both paging-indicators and paging-record-blocks. A system information broadcast indicates flexible resource usage and paging-record-block limits. Tracking area (TA)/cell association is provided for an MBMS-dedicated cell and geographically co-located non-MBMS-dedicated cells. MBMS-dedicated cell system information is broadcast to regulate WTRU operation while receiving MBMS within said cell. Generic Access Profile (GAP) definitions is part of system information.

7 Claims, 2 Drawing Sheets

U.S. PATENT DOCUMENTS

| | | | |
|---|---|---|---|
| 2008/0090593 A1* | 4/2008 | Jen | 455/458 |
| 2008/0188247 A1* | 8/2008 | Worrall | 455/458 |
| 2008/0233947 A1* | 9/2008 | Herrero-Veron | 455/422.1 |
| 2008/0233974 A1* | 9/2008 | Xu | 455/458 |
| 2010/0091720 A1* | 4/2010 | Chun et al. | 370/329 |

FOREIGN PATENT DOCUMENTS

| | | |
|---|---|---|
| EP | 1 283 648 | 2/2003 |
| EP | 1 478 198 | 11/2004 |
| EP | 1 509 056 | 2/2005 |
| EP | 1 643 792 | 4/2006 |
| EP | 1947779 A1 * | 7/2008 |
| GB | 2 297 460 | 7/1996 |
| GB | 2 415 330 | 12/2005 |
| WO | 99/62285 | 12/1999 |
| WO | 02/39758 | 5/2002 |
| WO | 2005/067180 | 7/2005 |
| WO | 2005/109939 | 11/2005 |
| WO | 2007/091865 | 8/2007 |
| WO | 2007/143753 | 12/2007 |

OTHER PUBLICATIONS

Alcatel-Lucent, "Considerations on BCH Design for E-MBMS", 3GPP TSG RAN WG2 #57, R2-070734, (St. Louis, Feb. 12-16, 2007).

Demain et al., "Scheduling to Minimize Gaps and Power Consumption", In Proceedings of the 19th ACM Symposium on Parallelism in Algorithms and Architectures (SPAA 2007), (San Diego, California, Jun. 9-11, 2007).

LG Electronics Inc., "Paging a Single Receiver UE for MBMS Dedicated Layer", 3GPP TSG-RAN WG2 #56, R2-063240, (Riga, Latvia, Nov. 6-10, 2006).

Motorola, Long Term Evolution (LTE): Overview of LTE Air-Interface Technical White Paper, (2007).

Nokia et al., "Transmission of P-BCH, P-SCH and S-SCH on Dedicated MBMS Carrier", 3GPP TSG-RAN WG1 Meeting #50bis, R1-074339, (Shanghai, China, Oct. 8-12, 2007).

NTT Docomo et al., "Paging Channel Structure for E-UTRA Downlink", 3GPP TSG RAN WG1 LTE Ad Hoc, R1-061666, (Cannes, France, Jun. 27-30, 2006).

Samsung, "Reception of the Paging on the MBMS Layer", 3GPP TSG RAN2#54, R2-062257, (Tallinn, Estonia, Aug. 28-Sep. 2, 2006).

Teliasonera Finland Medialab, "Mobile Broadcast/Multicast Services (MBMS)", White Paper, (Aug. 2004).

Third Generation Partnership Project, "Technical Specification Group Radio Access Network; Feasibility Study for Evolved Universal Terrestrial Radio Access (UTRA) and Universal Terrestrial Radio Access Network (UTRAN) (Release 7)", 3GPP TR 25.912, V7.1.0 (Sep. 2006).

Third Generation Partnership Project, "Technical Specification Group Radio Access Network; Feasibility Study for Evolved Universal Terrestrial Radio Access (UTRA) and Universal Terrestrial Radio Access Network (UTRAN) (Release 7)", 3GPP TR 25.912, V7.2.0 (Jun. 2007).

Third Generation Partnership Project, "Technical Specification Group Services and System Aspects; Requirements for Evolved UTRA (E-UTRA) and Evolved UTRAN (E-UTRAN) (Release 7)", 3GPP TR 25.913 V7.3.0 (Mar. 2006).

Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331 V8.1.0 (Mar. 2008).

Third Generation Partnership Project, "Technical Specification Group Radio Access Network; Evolved Universal Terrestrial Radio Access (E-UTRA) and Evolved Universal Terrestrial Radio Access network (E-UTRAN); Overall Description; Stage 2 (Release 8)", 3GPP TS 36.300, V8.0.0 (Mar. 2007).

Third Generation Partnership Project, "Technical Specification Group Radio Access Network; Evolved Universal Terrestrial Radio Access (E-UTRA) and Evolved Universal Terrestrial Radio Access network (E-UTRAN); Overall Description; Stage 2 (Release 8)", 3GPP TS 36.300, V8.4.0 (Mar. 2008).

Third Generation Partnership Project, "Technical Specification Group Services and System Aspects; Multimedia Broadcast/Multicast Service (MBMS); Architecture and Functional Description (Release 7)", 3GPP TS 23.246 V7.2.0 (Mar. 2007).

Third Generation Partnership Project, "Technical Specification Group Services and System Aspects; Multimedia Broadcast/Multicast Service (MBMS); Architecture and Functional Description (Release 7)", 3GPP TS 23.246 V7.4.0 (Sep. 2007).

Third Generation Partnership Project, "Technical Specification Group Services and System Aspects; Multimedia Broadcast/Multicast Service (MBMS); Architecture and Functional Description (Release 8)", 3GPP TS 23.246 V8.1.0 (Dec. 2007).

Third Generation Partnership Project, Technical Specification Group Radio Access Network; Physical Layer Aspects for Evolved Universal Terrestrial Radio Access (UTRA) (Release 7), 3GPP TR 25.814, V7.1.0 (Sep. 2006).

Wikipedia, "Multimedia Broadcast Multicast Service", Retrieved From http://en.wikipedia.org/wiki/Multimedia_Broadcast_Multicast_Service, (Last Updated on Mar. 27, 2008).

Wikipedia, "Simple Network Management Protocol", Retrieved from http://en.wikipedia.org/wiki/Simple_Network_Management_Protocol, (Last Updated on Apr. 29, 2008).

Yin et al., "Modifications to Appendix I: Overhead Calculations", IEEE 802.16 Broadband Wireless Access Working Group, IEEE C802.16m-07/153r1, (Jul. 13, 2007).

Agilent Technologies, "Block Error Measurement Description", Retrieved From http://wireless.agilent.com/rfcomms/refdocs/gsm/meas_bler_desc.html, (Last Updated on May 8, 2002).

European Telecommunications Standards Institute, "Universal Mobile Telecommunications System (UMTS); Evolved Universal Terrestrial Radio Access (E-UTRA) and Evolved Universal Terrestrial Radio Access (E-UTRAN); Overall Description; Stage 2 (3GPP TS 36.300 Version 8.0.0 Release 8)", ETSI TS 136 300 V8.0.0. (Mar. 2007).

Third Generation Partnership Project, "Technical Specification Group Services and System Aspects; Multimedia Broadcast/Multicast Service (MBMS); Architecture and Functional Description (Release)", 3GPP TS 23.246 V7.4.0 (Sep. 2007).

Ericsson, "Idle Gaps for Handover Measurements in E-UTRAN," 3GPP TSG-RAN WG2 (Radio) Meeting #54, R2-062134 (Aug. 28-Sep.1, 2006).

Huawei, "Measurement Gap Scheduling in HO Procedure in LTE," 3GPP TSG RAN2 #52 (Mar. 27-31, 2006).

LG Electronics, Inc., "UE assisted tracking area update," 3GPP TSG-RAN WG2 #57, R2-070199 (Jan. 15-19, 2007).

Nokia et al., "UE Capability for dedicated carrier MBMS and Unicast Reception," 3GPP TSG-RAN WG2 Meeting #56, R2-063066 (Nov. 6-10, 2006).

Agilent Technologies, "Block Error Measurement Description", Retrieved From http://wireless.agilent.com/rfcomms/refdocs/gsm/meas_bler_desc.html, (Last Retrieved From Updated on May 8, 2002).

LG Electronics Inc., "UE assisted tracking area update," 3GPP TSG RAN WG2 #57, R2-070199 (Jan. 15-19, 2007).

LG Electronics, Inc., "Paging a single receiver UE for MBMS Dedicated Layer," 3GPP TSG-RAN WG2 #56, R2-063240 (Nov. 6-10, 2006).

NTT Docomo, "Paging Procedure in LTE," 3GPP TSG-RAN WG2 Ad-hoc on LTE, R2-061982 (Jun. 27-30, 2006).

* cited by examiner

METHOD AND APPARATUS OF MEASUREMENT MECHANISM AND EFFICIENT PAGING AND BROADCASTING SCHEME IMPLEMENTATION IN MBMS DEDICATED CELL OF LTE SYSTEMS

CROSS REFERENCE TO RELATED APPLICATIONS

This application claims the benefit of U.S. Provisional Application No. 60/914,075, filed Apr. 26, 2007 and U.S. Provisional Application No. 60/914,217, filed Apr. 26, 2007, which are incorporated by reference as if fully set forth.

FIELD OF INVENTION

The present invention is related to wireless communication systems.

BACKGROUND

The Third Generation Partnership Project (3GPP) has lately initiated the LTE program to bring new technology, new network architecture, new configuration and new applications and services to the wireless cellular network in order to provide improved spectral efficiency and faster user experiences. At the same time, in order to continue to provide Multimedia broadcast Multicast services (MBMS) under the LTE network and technology, 3GPP has defined some new concepts and architectures for MBMS.

An objective of the Evolved Universal Mobile Telecommunication System (UMTS) project and UMTS Terrestrial Radio Access Network (UTRAN) project is to develop a packet optimized radio access network with high-data-rates, low-latency, and improved system capacity and coverage. In order to achieve this, improvements to the radio interface as well as the radio network architecture should be considered. For example, instead of using Code Division Multiple Access (CDMA), Orthogonal Frequency Division Multiple Access (OFDMA) and Frequency Division Multiple Access (FDMA) are being considered as air interface technologies to be used in the downlink and uplink transmissions, respectively. Another example is the application of packet switched services to an entire LTE network, resulting in all voice calls being made on a packet switched basis.

MBMS service is defined in the prior art. It is a counterpart of other multicast services operating in other spectrums, such as High Speed Digital Video Broadcasting (DVB-H). MBMS allows downlink data to be transmitted from a single source to multiple recipients in broadcast or multicast modes. The prior art also contains definitions of MBMS channels, scheduling, radio-bearers, procedures, and the like.

In the 3GPP LTE project, a new UTRAN and evolved core network have been introduced. Then new networks require changes to the current specifications for MBMS so that the new architecture can efficiently support MBMS services.

In a 3GPP LTE network, there are typically three types of cells; an MBMS dedicated cell, a mixed cell, and a unicast cell. The MBMS dedicated cell is dedicated to the downlink MBMS content transmission, and therefore there is no uplink access and function for any user equipment (UE). MBMS dedicated cells are usually deployed together, forming part of an MBMS synchronized transmission network (MBSFN) on the same frequency layer, (but different from the regular mixed/unicast LTE cells). The mixed cell has both the regular LTE cell's capability and also transmits downlink MBMS services and content over MBMS channels. The unicast cell is a regular LTE cell without MBMS service.

FIGS. 1(a)-1(c) show some examples of how the different cells may be deployed. In the prior art, when a WTRU switches to an MBMS dedicated cell from a unicast or mixed cell, the WTRU typically terminates the unicast service. The UTRAN can inform the WTRU of a new service request through paging.

It has been suggested that a single receiver WTRU should be able to receive MBMS services on a dedicated carrier and at the same time monitor paging for a possible incoming call. In general, there are two methods of paging a single receiver WTRU. One method is to transmit paging messages on an MBMS dedicated layer. Alternatively, the WTRU may transit or switch to a mixed or unicast cell to check for the incoming call paging.

Paging a WTRU that is receiving a signal on an MBMS dedicated layer has some problems. There may be problems with cell boundary update inefficiency and signaling overhead. The MBMS dedicated cell size typically is bigger than that of mixed cell, therefore a problem may result regarding how the WTRU that is operating on the MBMS dedicated layer detects that it has crossed the Tracking Area (TA) boundary. A WTRU cannot obtain any information regarding the change of TA while it operates in the MBMS dedicated layer.

Even if a WTRU can trigger a TA update (TAU), this will lead to an interruption of MBMS reception, since it can not be performed on the dedicated MBMS layer. Typically, a WTRU knows the scheduling pattern of the relevant MBMS services from the radio bearer (RB) configuration information and scheduling information. A WTRU typically returns to a camped unicast/mixed cell in the scheduled gap, and returns to the MBMS dedicated cell at the beginning of a scheduling data stream. During the interval, the WTRU may perform a non-MBMS procedure such as a TA or cell update. However, TAUs that are performed at too frequent a period may lead to large uplink signaling overhead.

A second problem may be paging inefficiency due to a large paging load. Typically, the size of a MBMS dedicated layer may be large and it may contain several unicast/mixed cell TAs along with a number of MBMS dedicated cells. If a paging channel is transmitted on a MBMS dedicated cell, it is possible that the paging request may be transmitted on the paging channels of all the MBMS dedicated cells, which may cause unnecessary system paging load. This may adversely reduce the effective data rate for the MBMS service.

Another problem may be delay while performing cell selection/reselection due to a WTRU's response to a paging signal, particularly when responding to an emergency service. This may cause a delayed paging response due to the cell selection/reselection process in the course of switching to the mixed/unicast cell after the reception of a paging signal in the MBMS dedicated cell. The impact may be severe when responding to an emergency call. In addition, signaling overhead might be a concern.

Assuming that a WTRU detects a number of neighboring cells, there is an estimated approximate 330 ms delay, on average, for the WTRU to perform cell selection or reselection and to get access to the mixed/unicast cell. This breaks down as 10 ms to perform measurements and 320 ms to read the relative broadcast channel (BCCH) information based on the system information broadcast (SIB) default schedule.

Another problem may be waste of resources when transmitting a paging message on both a MBMS dedicated cell and a mixed cell. It cannot be determined whether the paging is transmitted only on the MBMS dedicated layer or the paging is transmitted on the mixed cell and being duplicated on the MBMS dedicated layer. If the paging message is duplicated, paging messages will be transmitted on both the MBMS dedicated layer and the mixed cell. But the single receiver WTRU will be operating on the MBMS dedicated layer or the mixed cell only. Thus, the duplicated paging message may cause a waste of radio resources in one of these layers. It is thus desirable to provide more efficient paging as well as measurement schemes to aid in achieving significantly improved paging efficiency.

The current state of the LTE standards progress allows that an MBMS dedicated cell may also handle the regular WTRU idle mode paging. This is advantageous because a WTRU receiving MBMS service in the MBMS dedicated cell is able to monitor the possible incoming call paging without switching (inter-frequency switching) to a mixed cell or to a unicast cell, and therefore with no interruption to the MBMS service reception.

Therefore, in the LTE MBMS dedicated cell, there is a synchronization channel (SCH) for WTRU synchronization to the cell, a broadcast channel (BCH) for the WTRU to learn the system frame number and system information broadcast, the multicast channel (MCH) for the WTRU to receive MBMS related traffic, and the paging channel (PCH) for monitoring the incoming call paging.

There is a need to undertake the task to organize the WTRU's operations for MBMS service reception configuration, for paging monitoring and reception, for conveying to the WTRU the TA and the related cells association in order to allow the WTRU perform non-MBMS operations. It would be desirable to solve the dedicated cell paging arrangement problem and the tracking area update problem.

SUMMARY

Paging is performed in the paging channel of a dedicated MBMS cell, and system information content and certain parameters are broadcast by an LTE dedicated MBMS cell within a MBSFN. The UTRAN specifies MBMS dedicated cell-wide or layer-wide common gaps for a WTRU to perform neighbor cell measurement and TA updates (TAUs). Adaptive, semi-static or fixed gap patterns are provided, based on WTRU and cell and/or layer conditions such as cell load, WTRU mobility and other factors, can be used. A WTRU can choose its own switching time based on its mobility or other factors. Paging can be limited to only one TA within one dedicated MBMS cell or using a TA association and allocation method, reducing the paging load. The broadcast channel (BCH) of the MBMS dedicated cell supports paging. Paging may be based on a TA identifier for related mixed or unicast cells. The specific cell ID of a mixed or unicast cell may be used for a WTRU's random access process when responding to a paging request. Other cell access parameters may be used to reduce paging delay and for quick and efficient response to an emergency call. One of a cell association method and a candidate cell's load information may be provided inside the paging control channel (PCCH) as a paging request message. The system information from the LTE MBMS dedicated cell organizes the WTRU's operations for: service reception configuration; paging monitoring and reception; conveying TA and the related cells association; and publishing system-wide gap schedules to perform non-MBMS operations.

Using a flat BCH structure in an MBMS Dedicated Cell eliminates the need for a dynamic Broadcast Channel (D-BCH). The MBMS-dedicated cell employs a single paging channel for both paging-indicators (PIs) and the paging-record-blocks. System information includes flexible resource usage and limitations for the paging-record-block, TA/Cell association in terms TA assignment and association of an MBMS-dedicated cell and its geographically co-located non-MBMS-dedicated cells. This information regulates WTRU operation while receiving MBMS service within the MBMS-dedicated cell. MBSFN-wide MBMS definitions are included in the system information. The system information block (SIB), set forth in greater detail in paragraphs [0078] through [0083], is under the MBSFN scope, and, once acquired by the WTRU, there is no need for the WTRU to read the SIB again unless a value-tag has changed. The value tag for an SIB is an integer number (e.g., 1, 2, 3, . . . , 8 or more) to indicates the present SIB version. Checking the value tag determine if it is obsolete. Enhanced, reliable service and reduced paging overhead is obtained by providing parameters for: Tracking Area and Cell association; an multicast/broadcast Generic Access Profile (GAP) assignment for WTRUs to perform non-MBMS related tasks; the paging related operations; and WTRU measurements, as well as regular cell operation from the LTE dedicated MBMS cell.

BRIEF DESCRIPTION OF THE DRAWINGS

A more detailed understanding of the embodiments herein may be had from the following description, given by way of example and to be understood in conjunction with the accompanying drawings wherein.

DETAILED DESCRIPTION

Figure 1:
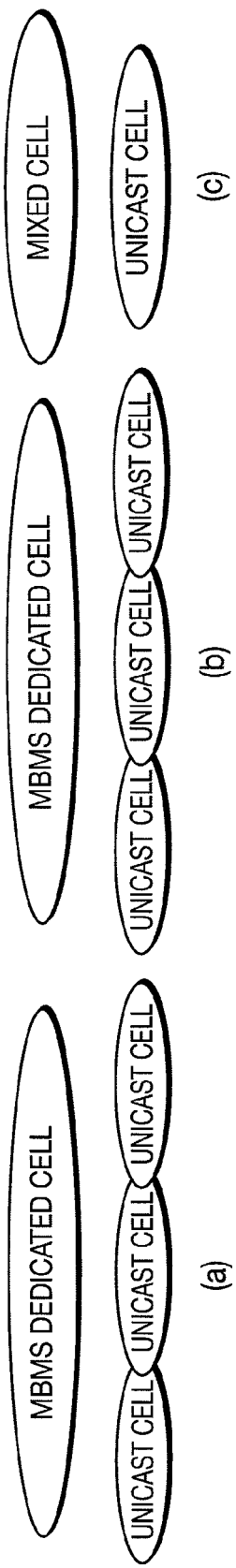
FIGS. 1(a)-1(c) show three (3) conventional MBMS cell deployment scenarios.

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

A WTRU typically switches from an MBMS cell to a mixed cell in a fixed or static gap pattern. In one embodiment, a WTRU may switch to a mixed cell during an MBMS scheduling gap or during some other predefined gap mechanism used for neighbor cell measurements and cell/TA update in an adaptive or semi-static gap pattern.

Normally, a WTRU will know a scheduling pattern of the desired MBMS services from radio bearer (RB) configuration information and scheduling information. A WTRU can return to the camped unicast/mixed cell during the scheduling gap for non-MBMS processes and then return to the MBMS dedicated cell to listen to the MBMS service at the beginning of scheduled data stream. During the gap interval, a WTRU can perform a non-MBMS procedure, such as measurement and a tracking area (TA)-update (TAU). One embodiment described herein includes methods for measuring neighbor cells and providing status updates to the WTRU in a mixed/unicast cell when the WTRU receives a paging message from an MBMS dedicated cell.

The frequency of measurement and uplink reporting and/or updating can be dependent on many factors, such as WTRU mobility, WTRU trajectory, location of the WTRU within a cell, and the like. For example, if a WTRU is moving at high mobility, which is above a certain threshold for a certain amount of time, the WTRU can indicate this situation in uplink (UL) reporting during a next available gap. This presents two methods to adaptively adjust the frequency of switching from an MBMS dedicated cell to the mixed cell.

In one embodiment set forth herein, a WTRU autonomously makes a decision regarding the number of gaps it should use to switch from a dedicated MBMS cell to a mixed cell for measurement and update processes. The exact number of gaps for periodicity is implementation specific and may be determined by the WTRU's mobility. The frequency of cell switching at the WTRU can be adaptively adjusted based on a WTRU's real time situation. For example, if a WTRU is at low mobility within one cell, then no measurement of a neighbor cell and no cell update need be performed on a per scheduled gap basis, thereby saving WTRU power and reducing uplink (UL) signaling overhead.

Alternatively, the WTRU may report its mobility status to the network during the next available scheduling gap for the mixed cell. The network then makes a decision and signals information to the WTRU that includes the number of scheduled gaps the WTRU should use to perform switching between the MBMS dedicated cell and the mixed cell for measurement and update processes. The WTRU can perform the switching based on a signal from the network. The WTRU may have the privilege to report a status change, such as the WTRU mobility, for example. This may trigger a new threshold, so that the next available scheduled gap may be used in order to update the WTRU's status on a real-time basis to the network.

Similar rules are applied when other factors are considered. For example, if the WTRU is detected close to the cell center or is moving towards the cell center, the WTRU may perform switching between two different cells on a low frequency basis. The specific measurements to be made when switching from the MBMS dedicated cell to the mixed cell may be specified in the broadcast information to the WTRU.

Figure 2:
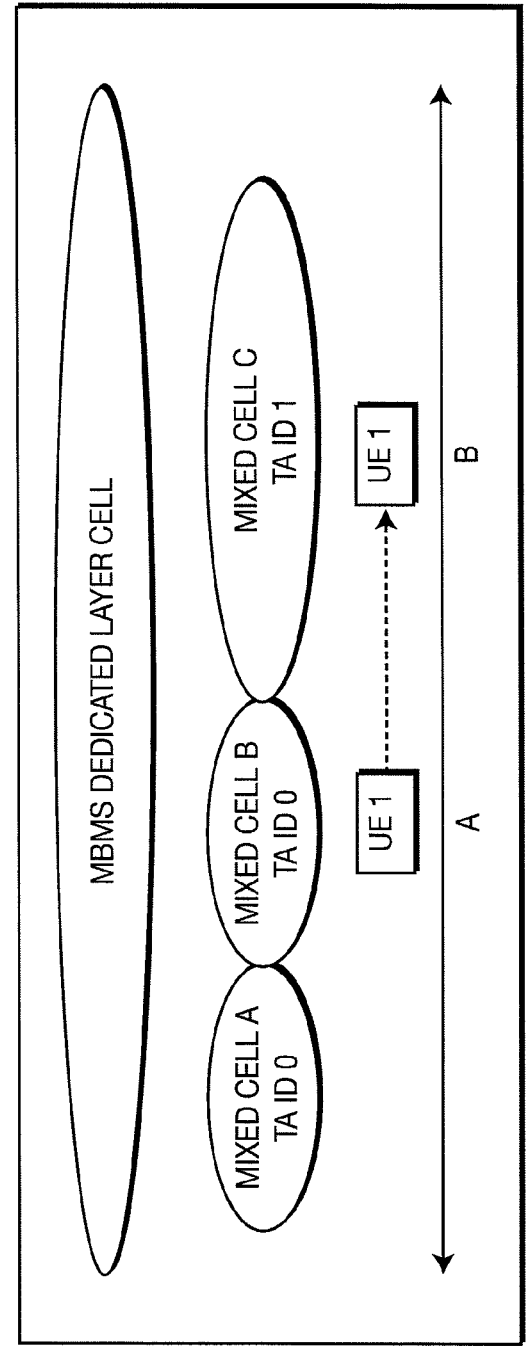
FIG. 2 is an example of a geographical deployment of MBMS dedicated cells and mixed cells in accordance with one embodiment.

A geographical relationship between the MBMS dedicated cell and the mixed cell is illustrated in FIG. 2. In FIG. 2 the cell size of a mixed cell is not the same as the size of an MBMS dedicated layer cell because the MBMS dedicated layer has no need to provide unicast service. Thus, the size of an MBMS dedicated cell is typically bigger than a mixed cell.

In order to avoid a large paging load by sending a paging message to all TAs covered by one MBMS dedicated cell, the paging message in a MBMS dedicated cell may be sent only to the MBMS dedicated cells belonging to one TA. If related neighbor or response cell information is to be included, only the information of the neighbor cell within the associated TA or cell is included in the Paging Channel (PCH) as part of a paging message. A WTRU can be assigned two TAs, one TA that covers only the MBMS dedicated cell and another TA that covers the mixed/unicast cells that are geographically co-located with the MBMS dedicated cell. As a result, switching between the MBMS dedicated cell and the geographically co-located mixed/unicast cell should not cause a TAU, since both of the TAs are assigned to the WTRU. Furthermore, the network paging entity (NPE) or mobility management entity (MME) can be optimized to page only the MBMS-TA, which covers only one cell, provided that the MBMS-TA-ID is assigned to be recognizable as one of the MBMS-TA-IDs.

If more than one TA needs to be paged, then the paging message may be sent only to cells within the multiple TAs. This may be determined by the network. If related neighbor cell information is to be included, then only the neighbor cells within those several TAs may be included in the paging message.

Selection of the number of TAs that are sent in the paging message may be dependent on the WTRU mobility, WTRU trajectory and its location within one cell or TA. For example, if a WTRU is moving at high speed towards the edge of one TA, based on the update information during a scheduled gap, the network can determine the adjacent TA toward which the WTRU is moving and decide how many TAs should be selected for sending the paging message.

The MBMS dedicated cell system information broadcast may include the MBMS-TA-ID for the cell with the cell-ID for the MBMS dedicated cell and the associated TA (TA-ID) and its cell IDs (mixed/unicast cells co-located under the MBMS dedicated cell) within one TA-ID. If more than one TA is covered by one MBMS dedicated cell, then cell IDs corresponding to each TA-ID may be included inside the broadcast information.

After receiving the PCH with the cell ID, and perhaps other access parameters, the WTRU can switch to the mixed/unicast cell and send an access message to the cell suggested by the PCH message to start the communication. Meanwhile, the measurement of neighbor cells may be performed by the WTRU so that a handover to a better cell may be performed.

The cell ID and neighbor cell load information may be included in the PCH message. This cell ID and access information may contain information that the paged WTRU can use to determine which cell this WTRU can camp on to respond to the paging request. When the WTRU is paged, it should quickly know which cell the WTRU should camp on in order to respond to the PCH message to begin the random access channel (RACH) process. By specifying the cell ID for the WTRU to camp on, any delay in cell measurement and cell selection/reselection after the WTRU switches from a MBMS dedicated cell to a mixed cell may be greatly reduced. After camping on the designated cell, the WTRU can initiate a normal measurement process to find the best cell for responding to a paging request such as starting the RACH process and a necessary radio resource control (RRC) connection procedure.

The RACH signature to be used for responding to a paging request may also be included into the PCH message. The resource allocation information for a RACH signature, either dedicated or random, can be included in the PCH message. By knowing the specific uplink (UL) transmission radio resources and dedicated RACH signature, the WTRU can respond to the paging request with minimal delay. This is especially useful for response to emergency call services. Alternatively, the WTRU may use a high priority application specific command set upon switching from an MBMS dedicated cell to a mixed/unicast cell to speed up the access process and thereby reduce access delay.

Paging Monitoring and Reception Information

There are two options for Paging channel arrangement in a MBMS dedicated cell:

(1) Following the current LTE paging approach of the non-MBMS-dedicated cells, paging-indicators (PIs) are sent in the downlink L1/2 control channel which is a Packet Data Control Channel (PDCCH), and paging messages are sent in the downlink shared channel (DL-SCH) channel. The advantage is that the WTRU's operation is the same; the disadvantage is that the cell must equip the DL-SCH in the downlink.

(2) A different channel structure in the MBMS-dedicated cell is employed for paging, given that the MBMS service channel scheduling uses the Multicast Channel (MCH) for both MBMS multicast control channel (MCCH) and MBMS multicast traffic channel (MTCH) so that there is no other traffic over the downlink L1/2 control channel PDCCH, as is the case in the non-MBMS-dedicated cells, wherein a wider-bandwidth downlink L1/2 control channel is employed to carry both the PI and the paging-message. It should be noted that paging messages can have a flexible number of resource blocks, depending on the number of paging records in the paging record block.

Figure 3:
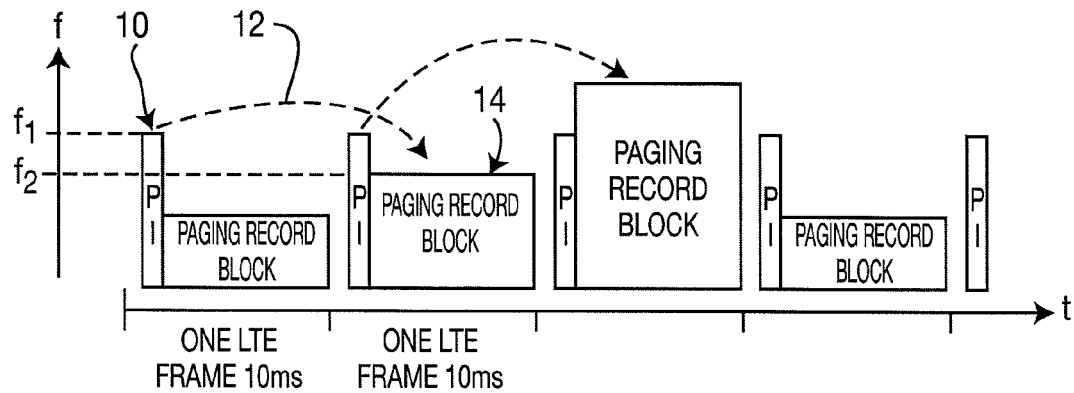
FIG. 3 is a paging arrangement in MBMS dedicated cells.

FIG. 3 shows a paging arrangement in MBMS dedicated cells in accordance with one embodiment.

1) PIs 10 are sent at a given frequency in the specific sub-frame of each LTE frame to signal the group of WTRUs waking up at that paging occasion for indicating whether there are incoming call(s).
2) The WTRU checks the PI to see if there is a paging message for the WTRU, or for the group which includes the WTRU.
3) If there is a paging message, the WTRU receives the paging message(s) in the next frame (which allows the WTRU to decode the PI) to see if there is an exact paging record for the WTRU. For example, the WTRU decodes the PI 10 and, when there is a message for the WTRU, jumps, at 12, to the next frame to obtain the paging message 14.
4) If an exact WTRU-ID match can be found in one of the paging records in the paging messages, then the WTRU is really paged and switches to the cell indicated by the paging record with other access parameters to perform the paging response.

The paging channel also conveys the System Information Change information to the WTRUs, the specific system-information-change flags being coded in the "paging message block".

Paging Related System Information for Broadcasting
PCH channel specific parameters comprise:
PCH related physical layer parameters such as:
  a) Power offset,
  b) Channel-coding,
  c) Transit (TX)-diversity-information; and
  d) Antenna-information.
PI related information such as:
  a) PI sub-frame offset within a frame, (or even PI-length in terms of n-sub-frames);
  b) the PI-internal-allocation-bit-composition; or
  c) paging indicator radio network temporary identity (PI-RNTI) information on each different paging occasion
Paging Record Block related information such as:
  a) Maximum number of sub-carriers
  b) Maximum number of paging-records, (preferably greater than 8 to surpass UMTS)

Alternatively, WTRUs receiving the MBMS services in the dedicated cell can use a uniform discontinuous reception (DRX) cycle length assignment published as part of the system information as opposed to the current DRX cycle assigned to the WTRU by the network at radio resource control (RRC) connection time. The advantage of this alternative is that the paging distribution function at an evolved Node-B (eNB) is simpler and provides a more even distribution of paging load.

TA and Non-MBMS-Dedicated Cell Association

Figure 4:
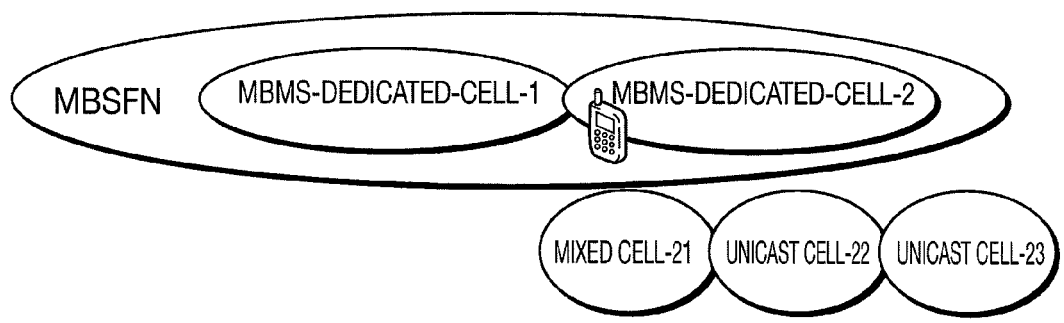
FIG. 4 is an MBSFN and co-located non-MBMS-dedicated cells.

If all of the MBMS Dedicated cells in a MBSFN are assigned to a single TA-Id or if close-by non-MBMS-dedicated cells are assigned the same TA-Id as the MBMS Dedicated cell, this creates an unnecessarily heavy load in terms of paging efforts towards those other not involved cells, as shown in FIG. 4.

Note that mixed cell-11, unicast cell-12 and unicast cell-13 are identified as geographically co-located non-MBMS-dedicated cells with respect to the MBMS-Dedicated-Cell-2, which is in the same geographic area but operating on a different frequency band.

As shown in FIG. 4, if all of the MBMS-dedicated cells in the MBSFN are assigned to a single TA-Id, the MBMS-dedicated-cell-1 (which may include many more MBMS-dedicated cells, not shown) will also carry the paging unnecessarily. Also if the MBMS-dedicated-cell-2 and cells-11, -12 and -13 are assigned the same TA-Id, then cells-11, -12 and -13 will unnecessarily carry the paging load if the WTRU is in the MBMS-dedicated-cell-2. In addition, if the WTRU is only in cell-11, the MBMS-dedicated-Cell-2 would be carrying an unnecessary load.

Figure 5:
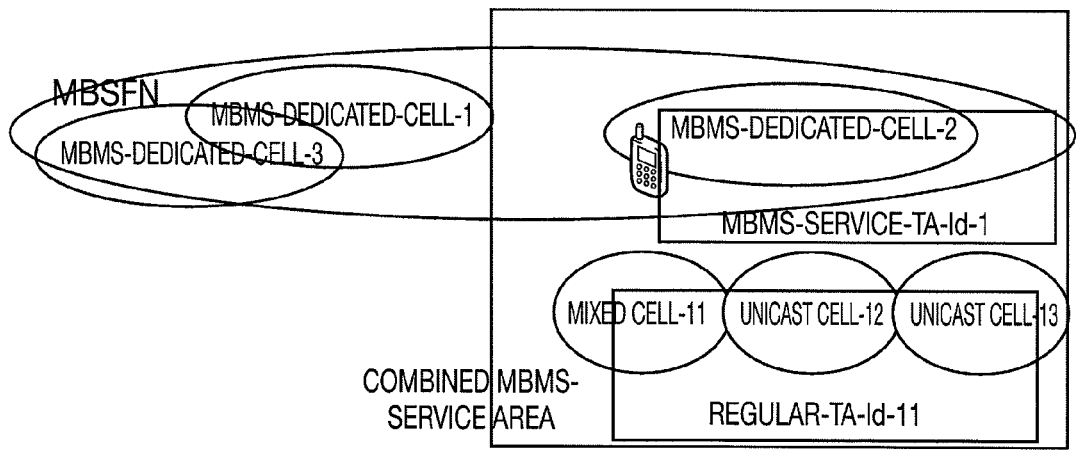
FIG. 5 is a combined TA/cell association from an MBMS-dedicated cell.

In order to reduce the unnecessary paging load to a minimum achievable amount, making reference to FIG. 5, it is proposed avoid assigning a single TA-Id for all of the MBMS-Dedicated-Cells in an MBSFN. TA-Id assignment to MBSFN cells shall be: 1) one TA-Id to one or more cells in high mobility areas, such as a highway or vicinity; and 2) one TA-Id to one cell in a non-high-mobility area.

It is also proposed to avoid assigning the same TA-Id to a MBMS-dedicated-cell and to its close-by or geographically co-located non-MBMS-dedicated cells by: assigning one TA-Id (MBMS-service-TA or say TA-Id-1, for example) to the MBMS-dedicated cell; and assigning another TA-Id (regular-TA or TA-Id-11, for example) to the co-located non-MBMS-dedicated cells; if the WTRU is only in the co-located non-MBMS-dedicated cells, then assign the regular-TA-Id (TA-Id-11, for example) to the WTRU; or if the WTRU joins the MBMS service in a combined MBMS service area at MBMS-dedicated-Cell-2, then the system, during a TAU, accepts a message, and assigns both TA-Ids (MBMS-service-TA, TA-Id-2, for example, and regular-TA, TA-Id-11, for example) to the WTRU by the multiple-TA registration scheme shown in FIG. 5.

In a multiple registration scheme, the WTRU with the two different TA IDs may register with multiple cells, MBMS-dedicated and non-MBMS dedicated cells. TAU is well known in the art as described, for example, in U.S. Pat. No. 7,260,396, incorporated herein by reference thereto.

The advantage is that, given the LTE multiple-TA registration property, the WTRU does not have to perform a TAU when switching between MBMS-dedicated-cell(s) and the co-located non-MBMS-dedicated-cells for paging response or other non-MBMS operations such as periodic TAUs, the periodic TAU interval being much longer.

Alternatively, the feedback mechanism, counting procedure or TAU or other like scheme supported by MBMS can be used to optimize paging in that the network can learn from the feedback that the WTRU is under the MBMS service in MBMS-dedicated-cell-2, and therefore page the MBMS-dedicated-cell-2 first.

An optimization scheme which further facilitates a reduction of the system paging load is such that, if the WTRU MM context, at the network paging-entity, shows that the WTRU is assigned both an MBMS-service-TA and a non-MBMS-service-TA, the MBMS-service-TA cell(s) are paged first.

Therefore the MBMS-service-TA-Id is made distinguishable or recognizable by the paging entity by using a special Mobile Network Code (MNC) of the public land mobile network identification (PLMN-ID) component within the TA-Id or a special flag.

System Information Broadcast on the TA/Cell Association

The TA/Cell association system information is unique to the MBMS-dedicate cell system information broadcasting. This part of the information elements includes: 1) MBMS-Service-TA-Id and its member MBMS-dedicated cell-Ids; and 2) the co-located non-MBMS-dedicated cell Regular-TA-Id and its associated cell-Ids.

The semantics of these system information parameters to a WTRU under dedicated MBMS service: perform incoming paging monitoring in only the current cell (under the MBMS-Service-TA); between the MBMS-Service-TA-Id and the Regular-TA-Id cells, no TAU is needed (except the periodic TAU); perform the MBMS measurement to the cell(s) in the MBMS-Service-TA; perform regular measurements to the cells in the regular-TA; and perform non-MBMS operations in only one of the co-located non-MBMS-dedicated-cells under the Regular-TA; the operations including paging-response, TAU and other necessary actions.

System-Wide Gap Scheduling for Non-MBMS Operations

The system information broadcast may include the MBMS transmission GAP information, which is unique to the MBMS dedicated cells of an MBSFN since MBMS transmission within the entire MBSFN area is synchronized.

The MBSFN-wide MBMS dedicated cell GAP scheduling information shall have the scope of an MBSFN. This means that although the GAP scheduling information is published in each MBMS-dedicated cell, once it is acquired, the WTRU does not have to read the scheduling information again on this part/whole of the system information block within the MBSFN unless there is an explicit value-tag change. The value tag lately acquired through the MIB shows the SIB currently stored in the WTRU memory is obsolete, for example.

The GAPs apply to all MBMS services and to all WTRUs receiving the MBMS service from this particular MBSFN area.

The GAPs are provided for the WTRU to perform non-MBMS operations in any of the regular cells.

The MBMS-dedicated cell GAP information includes: the GAP pattern description, which is: 1) the GAP beginning frame number (in relation to LTE frame-0) of an LTE frame and may be a sub-frame number within a frame; 2) GAP length in units of LTE frames or in units of LTE sub-frames; a GAP length longer than an LTE frame and GAP spans over multiple LTE frames (full or partial) are possible; 3) the repetition period length in terms of LTE frames to form the GAP pattern; and 4) multiple GAP patterns are possible. By default, the subsequent pattern occurs after the previous one in a round robin fashion. Alternatively the patterns may be specified at a certain time range. The MBMS-dedicated cell GAP information also includes the GAP pattern general validity time span description, which includes absolute validity time span relative to a universal time (i.e., valid until a GMT time or a valid until SIB changes) or relative time range during a day (weekday/weekend) and may indicate which specific pattern shall be used.

Measurement Related System Information

Since the WTRU is in LTE_Idle mode when accessing the MBMS-dedicated cells for receiving the MBMS services in the MBSFN area, the WTRU measurements are for cell reselection only and specifically for reselecting most preferably to another MBMS-dedicated cell, if possible.

Consequently the measurement activity related to an MBMS-serviced WTRU includes:

Measuring the MBMS reception on the current MBMS-dedicated cell via a retrieve state reply (RSRP) and/or block error rate (BLER). Measurement reports on the MBMS measurement can be attached to the TAU message or it can be reported directly if the measured values are above or below certain thresholds to indicate MBMS transmission problems even if the WTRU is in the LTE_Idle mode.

Measuring the non-MBMS-dedicated cells in its associated regular-TA for RSRP. The retrieve state request (RSRQ) may also be measured; if the measurements are below given thresholds (based on the non-MBMS-dedicate cell specified thresholds), the WTRU starts a scan for new non-MBMS-cells and prepares for cell reselection.

System Information Broadcast parameters for measurements include: thresholds for MBMS specific measurements within the MBSFN, BLER, RSRP; measurement report parameters, such as a threshold value for a special MBMS measurement event. The threshold values may be in units of dBm, a "Hysteresis" value in dB, and a "time to trigger" value given in milliseconds.

System Information Block Organization in LTE MBMS Dedicated Cell

Given that the MBMS-dedicated cells do not have any uplink channels and provide only MBMS related services, the system information broadcast in the MBMS-dedicated cells are significantly reduced in volume and much more static in terms of system information content change in comparison with system information broadcast by a regular LTE cell.

The reduced intensity of system information broadcast provides a simplified broadcast structure requiring only a primary broadcast channel, and no dynamic broadcast channel for the cell such that a flat BCH (only in center 1.25 MHz, no D-BCH) may be used with most of the following types of the system information broadcast very infrequently, as set forth in Table 1.

TABLE 1

| System Information category/group | Scope | Contents Summary | Repetition Rate | Content change rate |
|---|---|---|---|---|
| MIB (1) | Cell | Important identities about this cell (no cell-barring, cell load information) | Most Often (regular MIB rate, i.e. 80 ms) | Almost never changes |
| MCH Configuration (2) | Cell or MBSFN | MCH related configurations | Often | Infrequent |
| TA and Cell association (3) | Cell | The tracking area and cell associations between an MBMS-dedicated cell and other co-located regular cells | Infrequent (since the WTRU does not have to do the TAU very soon) | Almost never changes |

TABLE 1-continued

| System Information category/group | Scope | Contents Summary | Repetition Rate | Content change rate |
|---|---|---|---|---|
| Paging Parameters (4) | Cell or MBSFN | Paging related parameters | Less often | Infrequent |
| GAP Pattern (5) | MBSFN | GAP pattern description for WTRU to perform non-MBMS operations in regular cells | Very infrequent | Very infrequent |
| Measurement parameters (6) | MBSFN | MBMS measurement related parameters | Very infrequent | Very infrequent |

(1) MIB (Management Information Block) Parameter provides an indication this is a MBMS-dedicated cell (1-bit)
Cell-id and TA-id
MBSFN-Id
Only the primary PLMN-ID (no other PLMN-Ids for network sharing)
Scheduling Unit (SU)—Scheduling information type—indicates the type of the current system information block (SIB) broadcast combination (different schedule combination for SIBs broadcast in the MBMS dedicated cell in the standards and indicate which combination by a number).
(2) MBMS Cell Specific—MCH configurations
MCH or equivalent physical channel parameters such as scrambling/channel codes, diversity information, channel timing information
MCCH configuration parameters
MTCH configuration with MBMS service information
(3) MBMS Cell Specific—TA/Cell Association Block
See paragraphs [0069] to [0071] set forth above;
(4) MBMS Cell Specific—Paging Related Parameter Block
See paragraphs [0055] to [0057] set forth above;
(5) MBMS Cell Specific—GAP Pattern Block
See paragraphs [0077] set forth above;
(6) MBMS Cell Specific—MBMS Measurement parameters
See paragraphs [0078] to [0081] set forth above;
The above two categories of system information (i.e., MBMS Cell Specific—GAP pattern block and MBMS Measurement parameters) can be combined, if desired.

Although the features and elements are described in particular combinations, it should be understood that each feature or element can be used alone without the other features and elements of the preferred embodiments or in various combinations with or without other features and elements. The methods or flow charts may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (WTRU), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for paging employed by a long-term evolution (LTE) node, the method comprising:
    sending paging indicators (PIs) in a specific sub-frame of each long-term evolution (LTE) frame to indicate to wireless transmitter receiver units (WTRUs) a presence of an incoming call for a WTRU identified in the paging indicator; and
    sending a paging record in an LTE frame following the frame containing the PI for the WTRU to provide instructions to the identified WTRU, wherein paging is performed in an multimedia broadcast multicast services (MBMS) dedicated cell and the MBMS-dedicated cell employs a single paging channel for both PIs and paging record blocks.

2. The method of claim 1, wherein the PI includes a group identification (ID) identifying WTRUs which are members of said group.

3. A method for use by a multimedia broadcast multicast services (MBMS) dedicated cell, comprising: sending paging indicators (PIs) and paging record blocks to WTRUs over a single paging channel (PCH) and employing a different channel for paging unicast MBMS service, the single paging channel being configured to convey system change information to the WTRUs.

4. The method of claim 3, wherein the paging channel provides specific parameters including physical layer parameters.

5. The method of claim 4, wherein the physical layer parameters include power off-set, channel coding, transmit diversity information and antenna information.

6. The method of claim 3, wherein the paging indicator includes at least one of a sub-frame off-set within a frame and a paging indicator length as represented by n-sub-frames.

7. The method of claim 6, wherein paging indicator information further includes at least one of paging indicator internal-allocation-bit-composition, and paging indicator radio network temporary identity (PI-RNTI) information for each paging occasion.

* * * * *